Aug. 12, 1924. Re. 15,890

G. F. TAYLOR

THERMOSTAT

Original Filed Dec. 13, 1923

INVENTOR.

George F. Taylor

WITNESSES.

John P. Woodworth

Reissued Aug. 12, 1924. Re. 15,890

UNITED STATES PATENT OFFICE.

GEORGE F. TAYLOR, OF WASHINGTON, DISTRICT OF COLUMBIA, DEDICATED, BY MESNE ASSIGNMENTS, TO THE CITIZENS OF THE UNITED STATES OF AMERICA.

THERMOSTAT.

Original No. 1,484,802, dated February 26, 1924, Serial No. 680,473, filed December 13, 1923. Application for reissue filed June 2, 1924. Serial No. 717,447.
(FILED UNDER THE ACT OF MARCH 3, 1883, 22 STAT. L., 625.)

*To all whom it may concern:*

Be it known that I, GEORGE F. TAYLOR, a citizen of the United States of America, and an employee of the United States Department of Agriculture, residing in Washington, District of Columbia, have invented a new and useful Thermostat.

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to me of any royalty thereon.

The object of my invention is to provide a device by the application of which either automatic temperature control or automatic temperature recording may be secured.

Figure 1:
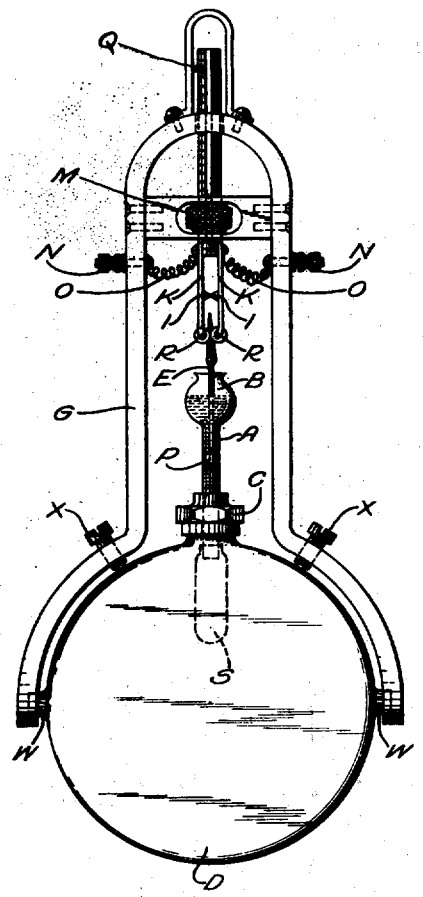
Figure 2:
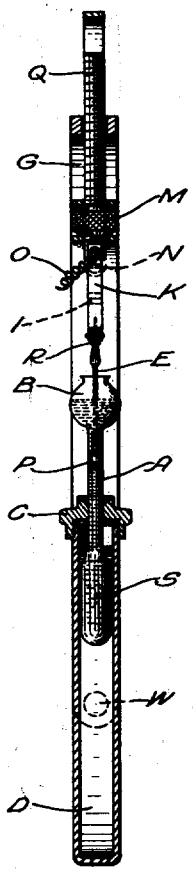
Figure 3:
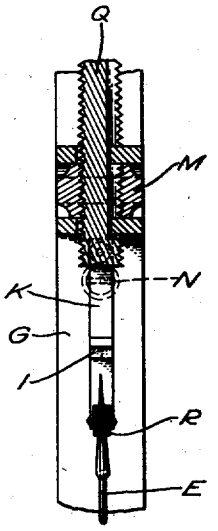
Figure 4:
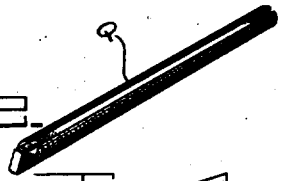
Figure 5:
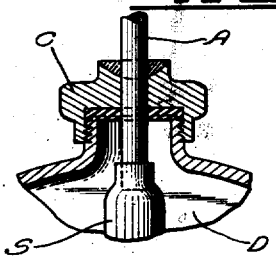

The invention will be fully described in connection with the accompanying drawing in which Fig. 1 shows a front elevation of the entire apparatus; Fig. 2 is a vertical sectional view thereof; Fig. 3 is an enlarged fragmentary vertical sectional view illustrating the key way of the grooved pin engaged by the keys, carried by the knurled nut housing; Fig. 4 is a perspective view of the grooved pin, and Fig. 5 is an enlarged fragmentary vertical sectional view illustrating the method of sealing the container tap.

A is a tube with a bulb B at its upper end. To the lower end of the tube A is attached a rubber sack S. Just above this sack S a brass collar C fits securely around the glass tube A and screws into the expansion bulb D. P represents a spherical piston made of steel, bone or other substance which does not amalgamate with mercury. The stem E of the piston is attached to the sphere and extends through the bulb B.

When the apparatus is in use the expansion bulb D is filled with alcohol, ether, or other liquid of high coefficient of expansion which does not injure rubber. The rubber sack S, the tube A and the lower part of the bulb B are filled with mercury. A rise of temperature in the liquid in the bulb D is accompanied by an increase in volume, which forces the mercury out of the rubber sack S into the tube A. A small air space is left around the sphere P. The surface tension of the mercury being very high, will cause the mercury to force the piston P upward, rather than flow around it. A lowering of the temperature in the bulb D will produce the reverse effect due to the atmospheric pressure on the surface of the mercury in B. The movement of the piston stem E may be employed to operate either a thermostat, a thermo-regulator, or a thermograph.

The accompanying drawing shows a thermostat, and illustrates the way in which it is operated by the device just described.

G is a frame which supports the entire apparatus, W and W are pivots on which the bulb D with its attached parts may be turned for greater convenience in filling or cleaning. The lock screws X hold the bulb and parts in their normal position. Q is a threaded and grooved pin which is raised or lowered by turning the nut M. On the lower end of the pin Q, two springs K are attached opposite each other. They are electrically insulated from each other and from the frames G. Each spring is connected by a wire O to a binding post N, the latter attached to the frame but insulated from it. Between the springs are two contact points I. A small roller R made of an insulating material is attached to the end of each spring K. The plunger E is wedge shaped at its upper end and fits between the shallow grooves in the rollers R. When the plunger E moves upward due to a rise of temperature in the bulb D (described above), the rollers R are forced apart and the contacts I are separated. This breaks an electric current which flows through heating coils (not shown in figure) and the temperature falls. The reverse movements now take place and the temperature is held at a fixed point.

If the temperature to be controlled or recorded must be at a distance from the controlling or recording device, a capillary metallic tube (not shown) may be inserted between the bulb D and the tube A.

In this device the advantages of mercury in temperature regulating instruments are combined with those of the more expansive liquids. It will be noted that no fouling of the mercury can take place in the working parts. The only place where oxidation can occur is on the surface of the mercury in the bulb B, where it is of no consequence. It will be noted that the mercury is used only as a medium to transmit motion and that no electrical contact is made with it; also that shaking or jarring has no significant effect upon the operation of the instrument.

The electrical contacts in this thermostat are as heavy as those of an ordinary relay. It may therefore be used directly on an ordinary alternating current lighting circuit without the use of a relay.

I claim:

A thermostat consisting of a frame, a tube and an expansion bulb supported by said frame, said tube having an enlargement at its upper end and a rubber sack at its lower end, a spherical piston fitting loosely into said tube, a stem attached to said piston at its lower end and extending upwardly through said tube, said expansion bulb adapted to enclose said sack, said sack, tube and the lower part of the said enlargement of said tube containing mercury, a small air space provided in said tube around said piston, said sack and lower end of said tube being hermetically sealed into said expansion bulb, said expansion bulb containing liquid, said piston and stem adapted to be moved in an upward or downward direction by means of motion imparted thereto by the rising or falling of the mercury in said tube resulting from compression or the release of compression on the mercury in said rubber sack due to the expansion or contraction of the liquid in said expansion bulb.

GEORGE F. TAYLOR.